United States Patent
Matsumura et al.

(10) Patent No.: US 11,930,518 B2
(45) Date of Patent: Mar. 12, 2024

(54) TERMINAL, RADIO COMMUNICATION METHOD, AND SYSTEM FOR TRANSMITTING CAPABILITY INFORMATION AND RECEIVING OPERATION OF CHANNEL STATE INFORMATION REFERENCE SIGNAL

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 350 days.

(21) Appl. No.: 17/432,722

(22) PCT Filed: Feb. 22, 2019

(86) PCT No.: PCT/JP2019/006882
§ 371 (c)(1),
(2) Date: Aug. 20, 2021

(87) PCT Pub. No.: WO2020/170444
PCT Pub. Date: Aug. 27, 2020

(65) Prior Publication Data
US 2022/0022207 A1    Jan. 20, 2022

(51) Int. Cl.
*H04W 72/54* (2023.01)
*H04W 72/044* (2023.01)
*H04W 72/1263* (2023.01)
*H04W 72/23* (2023.01)

(52) U.S. Cl.
CPC ......... *H04W 72/54* (2023.01); *H04W 72/046* (2013.01); *H04W 72/1263* (2013.01); *H04W 72/23* (2023.01)

(58) Field of Classification Search
CPC ... H04W 72/54; H04W 72/23; H04W 72/046; H04W 72/1263
See application file for complete search history.

(56) References Cited

U.S. PATENT DOCUMENTS

| 2019/0174466 A1* | 6/2019 | Zhang | H04L 5/0057 |
| 2019/0260456 A1* | 8/2019 | Zhou | H04B 7/0695 |
| 2019/0274169 A1* | 9/2019 | Tsai | H04W 56/0045 |

(Continued)

OTHER PUBLICATIONS

3GPP TSG-RAN1 Meeting #96, R1-1902120 Athens, Greece, Feb. 25-Mar. 1, 2019 Change Request 38.214 CR Draft Rev, Current version: 15.4.0 (Year: 2019).*

(Continued)

*Primary Examiner* — Chi H Pham
*Assistant Examiner* — Weibin Huang
(74) *Attorney, Agent, or Firm* — Osha Bergman Watanabe & Burton LLP

(57) ABSTRACT

In order to appropriately control the reception of a CSI-RS, one aspect of user terminal of the present disclosure includes: a receiving section that receives a channel state information reference signal based on downlink control information; a transmitting section that transmits given information related to the minimum number of symbols between the downlink control information and the channel state information reference signal; and a control section that performs a control an operation of receiving the channel state information reference signal according to a value of the given information.

4 Claims, 7 Drawing Sheets

(56) References Cited

U.S. PATENT DOCUMENTS

| | | | |
|---|---|---|---|
| 2020/0145982 A1* | 5/2020 | Cheng | H04L 5/0023 |
| 2021/0242926 A1* | 8/2021 | Yang | H04B 7/0695 |
| 2021/0259009 A1* | 8/2021 | Chen | H04B 1/713 |

OTHER PUBLICATIONS

Extended European Search Report issued in counterpart European Patent Application No. 19916161.3, dated Oct. 5, 2022 (11 pages).
Vivo; "Draft CR on beam management", 3GGP TSG RAN WG1 Meeting #95, R1-1812285; Spokane, USA; Nov. 12-16, 2018 (4 pages).
Office Action issued in the counterpart Japanese Patent Application No. 2021-501360, dated Oct. 18, 2022 (8 pages).
Office Action in the counterpart Chinese Application No. 201980095666.0, dated Jun. 19, 2023 (26 pages).
Vivo; "Draft 38.214 CR on default QCL for aperiodic CSI-RS"; 3GPP TSG-RAN WG1 Meeting #96, R1-1901655; Athens, Greece; Feb. 25-Mar. 1, 2019 (3 pages).
Office Action issued in Japanese Application No. 2021-501360 dated Mar. 28, 2023 (8 pages).
International Search Report issued in PCT/JP2019/006882 dated Apr. 23, 2019 (5 pages).
Written Opinion issued in PCT/JP2019/006882 dated Apr. 23, 2019 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Ericsson., "Correction to aperiodic CSI-RS triggering with different numerology between PDCCH and CSI-RS", 3GGP TSG-RAN1 Meeting #96, R1-1902120, Athens, Greece, Feb. 25-Mar. 1, 2019 (3 pages).

* cited by examiner

TERMINAL, RADIO COMMUNICATION METHOD, AND SYSTEM FOR TRANSMITTING CAPABILITY INFORMATION AND RECEIVING OPERATION OF CHANNEL STATE INFORMATION REFERENCE SIGNAL

TECHNICAL FIELD

The present disclosure relates to user terminal and a radio communication method in next-generation mobile communication systems.

BACKGROUND ART

In a universal mobile telecommunications system (UMTS) network, Long Term Evolution (LTE) has been specified for the purpose of further high-speed data rate, low latency, and the like (see Non Patent Literature 1). LTE-Advanced (3GPP Rel. 10 to 14) has been specified for the purpose of further larger capacity and sophistication of LTE (third generation partnership project (3GPP) release (Rel.) 8, 9).

Successor systems of LTE (e.g., also referred to as 5th generation mobile communication system (5G), 5G+ (plus), New Radio (NR), and 3GPP Rel. 15 or later) are considered.

In the existing LTE system (for example, LTE Rel. 8 to 13), user equipment (UE) controls a reception of a downlink shared channel (for example, physical downlink shared channel (PDSCH)) based on downlink control information (DCI, also referred to as DL assignment, or the like) from a radio base station. In addition, the UE controls a transmission of an uplink shared channel (for example, physical uplink shared channel (PUSCH)) based on the DCI (also referred to as UL grant).

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In a future radio communication system (for example, NR), the user equipment (UE) measures a channel state by using a channel state information reference signal (CSI-RS), and feeds back (reports) the channel state information (CSI) to a network (for example, a base station).

Aperiodic CSI (AP-CSI, A-CSI) reporting has been studied as a CSI feedback method. The CSI-RS measured for AP-CSI reporting may be referred to as AP CSI-RS or A-CSI-RS (Aperiodic CSI-RS).

In the NR, it is studied that an assumption of quasi-co-location (QCL) for receiving the AP-CSI-RS is determined based on the beam switch timing reported by the UE.

However, in the current NR specification, how to control the CSI-RS reception operation in a case where the value of the reported beam switch timing is equal to or greater than a given value has not been sufficiently studied. Therefore, when the current NR specification is followed, there is a possibility that the CSI-RS reception operation (for example, the TCI state (QCL assumption) of the CSI-RS is appropriately determined to measure the CSI) cannot be performed.

Therefore, it is an object of the present disclosure to provide user terminal and a radio communication method capable of appropriately performing a control of a reception of a CSI-RS.

Solution to Problem

User terminal according to an aspect of the present disclosure includes: a receiving section that receives a channel state information reference signal based on downlink control information; a transmitting section that transmits given information related to a minimum number of symbols between the downlink control information and the channel state information reference signal; and a control section that performs a control of an operation of receiving the channel state information reference signal according to a value of the given information.

Advantageous Effects of Invention

According to an aspect of the present disclosure, the reception of the CSI-RS can be appropriately controlled.

Figure 1:
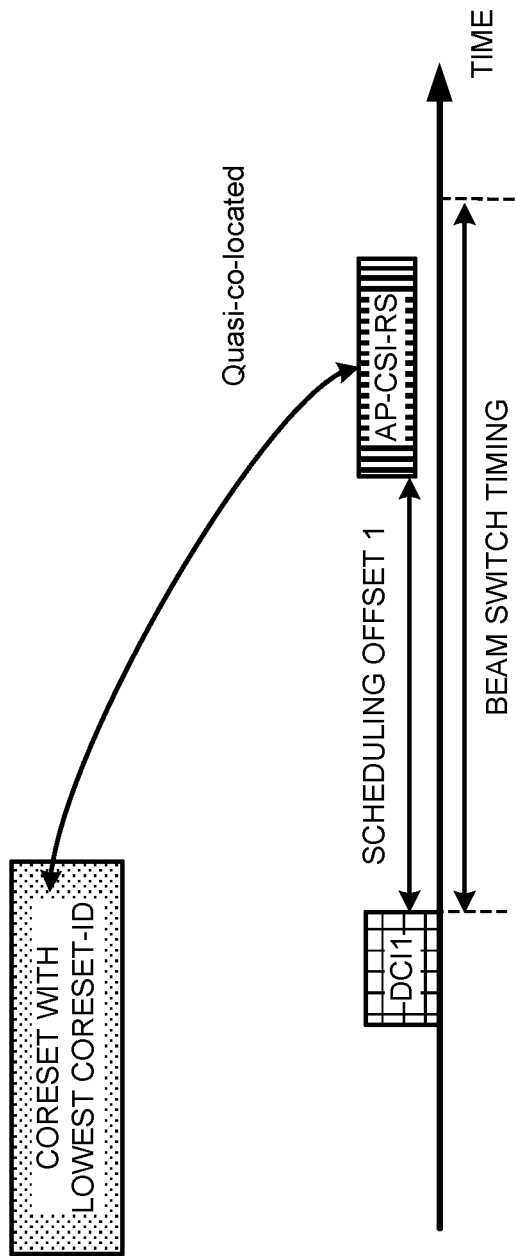
FIG. 1 is a diagram illustrating an example of QCL assumption of an AP CSI-RS according to a first aspect.

DESCRIPTION OF EMBODIMENTS (TCI, QCL, Spatial Relation)

In the NR, it has been studied to control reception processing (for example, at least one of reception, demapping, demodulation, or decoding) and transmission processing (for example, at least one of transmission, mapping, precoding, modulation, encoding) of at least one of a signal and a channel (expressed as a signal/channel) in the UE based on a transmission configuration indicator state (TCI state).

The TCI state may represent that applied to a downlink signal/channel. The TCI state applied to an uplink signal/channel may be expressed as a spatial relation.

The TCI state is information regarding quasi-co-location (QCL) of the signal/channel, and may be referred to as, for example, a spatial reception parameter and spatial relation information (SRI). The TCI state may be configured in the UE for each channel or each signal.

The QCL is an indicator indicating a statistical property of a signal/channel. For example, when one signal/channel and another signal/channel are in a QCL relation, this may mean that it is possible to assume that the plurality of different signals/channels have at least one identical property out of Doppler shift, Doppler spread, average delay, delay spread, or spatial parameter (for example, spatial reception parameter (spatial Rx parameter)) (a QCL relation is established regarding at least one of these).

Note that the spatial reception parameter may correspond to the reception beam of the UE (for example, reception analog beam), and the beam may be specified based on the spatial QCL. The QCL (or at least one element of the QCL) in the present disclosure may be replaced with spatial QCL (sQCL).

A plurality of types of QCL (QCL type) may be defined. For example, four QCL types A to D with different parameters (or parameter sets) that can be assumed to be identical may be provided. These parameters are as follows:

QCL type A: Doppler shift, Doppler spread, average delay, and delay spread,
QCL Type B: Doppler shift and Doppler spread,
QCL type C: Doppler shift and average delay, and
QCL type D: spatial reception parameter.

The fact that the UE assumes that a given control resource set (CORESET), channel, or reference signal has a specific QCL (e.g., QCL type D) relation with another CORESET, channel, or reference signal may be referred to as QCL assumption.

The UE may determine at least one of a transmission beam (Tx beam) and a reception beam (Rx beam) of a signal/channel based on the TCI state of the signal/channel or the QCL assumption.

The TCI state may be, for example, information regarding the QCL between a target channel (or a reference signal (RS) for the channel) and another signal (for example, another downlink reference signal (DL-RS). The TCI state may be configured (indicated) by higher layer signaling, physical layer signaling, or a combination thereof.

In the present disclosure, the higher layer signaling may be any of, for example, radio resource control (RRC) signaling, medium access control (MAC) signaling, broadcast information, and the like, or a combination thereof.

The MAC signaling may use, for example, a MAC control element (MAC CE), a MAC protocol data unit (PDU), and the like. The broadcast information may be, for example, a master information block (MIB), a system information block (SIB), remaining minimum system information (RMSI), and other system information (OSI).

The physical layer signaling may be, for example, downlink control information (DCI).

A channel for which the TCI state is configured (indicated) may be, for example, at least one of a downlink shared channel (physical downlink shared channel (PDSCH)), a downlink control channel (physical downlink control channel (PDCCH)), an uplink shared channel (physical uplink shared channel (PUSCH)), and an uplink control channel (physical uplink control channel (PUCCH)).

Furthermore, an RS (DL-RS) that has a QCL relation with the channel may be, for example, at least one of a synchronization signal block (SSB), a channel state information reference signal (CSI-RS), and a sounding reference signal (SRS). Alternatively, the DL-RS may be a CSI-RS used for tracking (also referred to as a tracking reference signal (TRS)) or a reference signal used for QCL detection (also referred to as a QRS).

The SSB is a signal block including at least one of a primary synchronization signal (PSS), a secondary synchronization signal (SSS), and a broadcast channel (physical broadcast channel (PBCH)). The SSB may be referred to as an SS/PBCH block.

An information element in the TCI state configured by higher layer signaling ("TCI-state IE" of RRC) may include one or a plurality of pieces of QCL information ("QCL-Info"). The QCL information may include at least one of information regarding the DL-RS having a QCL relation (DL-RS related information) and information indicating a QCL type (QCL type information). The DL-RS related information may include information such as an index of a DL-RS (for example, SSB index, non-zero-power CSI-RS (NZP CSI-RS) resource ID (identifier)), an index of a cell in which the RS is located, and an index of a bandwidth part (BWP) in which the RS is located.

<TCI State for the PDCCH>

The information regarding the QCL between a PDCCH (or a demodulation reference signal (DMRS) antenna port related to the PDCCH) and a given DL-RS may be referred to as the TCI state for the PDCCH or the like.

The UE may determine the TCI state for a UE-specific PDCCH (CORESET) based on higher layer signaling. For example, for the UE, one or a plurality of (K) TCI states may be configured for each CORESET by RRC signaling.

The UE may have one of the plurality of TCI states configured by RRC signaling activated by the MAC CE for each CORESET. The MAC CE may be referred to as a TCI state indication for UE-specific PDCCH MAC CE. The UE may monitor the CORESET based on an active TCI state corresponding to the CORESET.

<TCI State for the PDSCH>

The information regarding QCL between a PDSCH (or a DMRS antenna port associated with the PDSCH) and a given DL-RS may be referred to as the TCI state for the PDSCH.

The UE may be notified (configured) of M (M≥1) TCI states for PDSCHs (QCL information for M PDSCHs) by higher layer signaling. Note that the number M of TCI states configured in the UE may be limited by at least one of the UE capability and the QCL type.

The DCI used for PDSCH scheduling may include a given field (which may be referred as, for example, a TCI field, a TCI state field, or the like) indicating the TCI state for the PDSCH. The DCI may be used for PDSCH scheduling of one cell, and may be referred to as, for example, DL DCI, DL assignment, DCI format 1_0, DCI format 1_1, or the like.

Whether or not the TCI field is included in the DCI may be controlled by information notified from the base station to the UE. The information may be information (TCI-PresentInDCI) indicating whether the TCI field is present or absent in the DCI. The information may be configured in the UE by, for example, higher layer signaling.

When more than eight types of TCI states are configured in the UE, the MAC CE may be used to activate (or specify) eight or less types of TCI states. The MAC CE may be referred to as a TCI state activation/deactivation for UE-specific PDSCH MAC CE. The value of the TCI field in the DCI may indicate one of the TCI states activated by the MAC CE.

(CSI)

In the NR, the UE measures a channel state using a given reference signal (or a resource for the reference signal), and feeds back (reports) the channel state information (CSI) to the base station.

The UE may measure the channel state by using a CSI-RS, an SS/PBCH block, a DMRS, or the like as the reference signal.

As a method of feeding back the CSI, periodic CSI (P-CSI) reporting, aperiodic CSI (AP-CSI or A-CSI) reporting, semi-persistent CSI (SP-CSI) reporting, and the like have been studied.

The SP-CSI reporting using the PUCCH (PUCCH-based SP-CSI reporting) may be activated by the MAC CE. The SP-CSI reporting using the PUSCH (PUSCH-based SP-CSI reporting), the AP-CSI reporting using the PUSCH or PUCCH, and the like may be activated (or triggered) by the DCI.

For example, a CSI request field included in the DCI may specify one trigger state from a plurality of trigger states configured by higher layer signaling (for example, RRC signaling). Note that the CSI request field may be replaced with a CSI trigger field.

The CSI-RS measured for AP-CSI reporting may be referred to as AP CSI-RS (or A-CSI-RS) (Aperiodic CSI-RS). In the AP-CSI reporting, the DCI is used to trigger AP-CSI-RS measurement and AP-CSI reporting at the same time, and it is possible to dynamically trigger CSI reporting while efficiently using RS resources and uplink channel resources.

The list of trigger states for AP-CSI reporting may be configured in an RRC information element "CSI-AperiodicTriggerStateList". Each trigger state may be associated with one or more reporting configuration IDs (CSI-ReportConfigId), CSI resource configuration information, the TCI state (or QCL assumption) of AP-CSI-RS, and the like.

For an AP-CSI-RS resource of a CSI-RS resource set related to the trigger state, the UE may be indicated by a higher layer to perform QCL configuration including a QCL RS resource and a QCL type. For example, the TCI state (or QCL assumption) of the AP-CSI-RS may be specified by (the CSI request field of) the DCI that triggers the measurement of the AP-CSI-RS.

By the way, the period from the DCI to the AP CSI-RS indicated by the DCI may be specified in relation to the trigger state described above. For example, the UE determines the CSI-RS resource set ID corresponding to the CSI-RS resource set to be measured based on the trigger state. This CSI-RS resource set ID may be associated with an aperiodic triggering offset. The aperiodic triggering offset may be replaced with a scheduling offset.

The scheduling offset may mean an offset between the last symbol of the PDCCH (or the last slot including the PDCCH) transmitting the DCI that triggers the resource set of the AP CSI-RS and the first symbol (or slot) of the AP-CSI-RS resource of the resource set. As the scheduling offset of the AP CSI-RS, for example, a value of zero or more and four or less may be configured, or a value larger than four may be configured. The information of the scheduling offset of the AP CSI-RS may correspond to an RRC parameter "aperiodicTriggeringOffset".

Note that, in the present disclosure, the scheduling offset may mean a period from reception (for example, the last symbol) of given DCI (PDCCH) to start (for example, the first symbol) of a signal or channel scheduled (or triggered) by the DCI. The scheduling offset may be replaced by a period for scheduling, a period from the PDCCH to a scheduled signal/channel, or the like.

Further, studies are underway to define the UE capability regarding beam switching timing. The UE capability may be referred to as an AP-CSI-RS beam switching timing, simply a beam switching timing, a beam switch timing (RRC parameter "beamSwitchTiming"), or the like.

The beam switch timing may be defined by the minimum time (for example, the number of OFDM symbols) between the DCI that triggers the AP CSI-RS and the transmission of the AP CSI-RS. The beam switch timing may indicate the time from the last symbol that has received the DCI to the first symbol of the AP CSI-RS triggered by the DCI. The beam switch timing may be based on, for example, a delay in decoding of the PDCCH and beam switching.

The beam switch timing may be applied to at least one of a frequency range 2 (FR2) and a frequency range 2 (FR2). For example, FR1 may be a frequency range of 6 GHz or less (sub-6 GHz), and FR2 may be a frequency range higher than 24 GHz (above-24 GHz). Note that the frequency ranges, definitions of FR1, FR2, and the like are not limited to these.

The beam switch timing may have different values for each sub-carrier spacing (e.g., 60 kHz, 120 kHz).

The beam switch timing can take values such as 14, 28, 48, 224, and 336 symbols, for example. 224 or 336 symbols, which are relatively large values, are supported in the case where the UE is equipped with multi-panels, taking into account the time for turning the power of the panel that receives the AP CSI-RS from off to on. This is because the UE may turn off the panel of beams that are not activated.

In the NR specification studied so far, when the scheduling offset of the AP-CSI-RS is greater than or equal to the beam switch timing reported by the UE, and when the value of the reported beam switch timing is any of 14, 28 and 48, the UE may expect to apply the QCL assumption in the indicated TCI state for the AP-CSI-RS resource in the CSI trigger state indicated by the CSI trigger (request) field of the DCI (the UE is expected to apply the QCL assumptions in the indicated TCI states for the aperiodic CSI-RS resources in the CSI triggering state indicated by the CSI trigger field in DCI). That is, in this case, the UE may receive the AP-CSI-RS based on the TCI state indicated by the DCI.

Furthermore, in a case where the scheduling offset of the AP-CSI-RS is less than the beam switch timing reported by the UE and when the value of the reported beam switch timing is any of 14, 28, and 48, if there is another DL signal with the indicated TCI state in the same symbol as the AP-CSI-RS, the UE may apply the QCL assumption of the another DL signal when receiving the AP-CSI-RS. This is a specification that the TCI state of the AP-CSI-RS is not controlled by the DCI that triggers the AP-CSI-RS. This is because it takes time to switch the reception beam of the UE after demodulating the DCI and it is too late to receive the AP-CSI-RS.

Note that another DL signal here may be at least one of a PDSCH having a scheduling offset equal to or larger than a given threshold value (UE capability information "timeDurationForQCL") (that is, the offset from the reception of the DCI to the start of reception of the PDSCH scheduled by the DCI is equal to or larger than the given threshold value), an AP-CSI-RS (that is, another AP-CSI-RS), a P-CSI-RS, and an SP-CSI-RS having a scheduling offset equal to or larger than the beam switch timing of any of 14, 28, and 48 reported by the UE.

timeDurationForQCL may be defined as a minimum time (for example, the number of OFDM symbols) at which the UE receives the PDCCH and applies spatial QCL information of the PDCCH (DCI) for the PDSCH processing. The beam switch timing may indicate the time from the last symbol that has received the DCI to the first symbol of the AP CSI-RS triggered by the DCI. timeDurationForQCL may be referred to as Threshold-Sched-Offset as a physical layer parameter. timeDurationForQCL may take a value such as 7, 14, or 28 symbols, for example.

Note that the QCL assumption of another DL signal described above may be applied to the AP-CSI-RS only when an NZP CSI-RS resource set that specifies the AP-CSI-RS resource does not have higher layer parameters "trs-Info" and "repetition".

In the NZP CSI-RS resource set in which trs-Info is set to true, it is sufficient if antenna ports of all NZP CSI-RS resources in the resource set are the same. The NZP CSI-RS resource set in which repetition is set to off need not be assumed by the UE that the NZP CSI-RS resource in the resource set is transmitted by the same downlink spatial domain transmission filter.

Note that, in the present disclosure, the threshold value related to another DL signal may correspond to the beam switch timing in a case where the another DL signal is the AP-CSI-RS, and may correspond to the value of timeDurationForQCL reported by the UE in a case where the another DL signal is the PDSCH.

However, the current NR specification cannot cope with the CSI-RS reception operation (for example, determination of the TCI state or QCL assumption to be applied) when the value of the reported beam switch timing is large (for example, 224 or 336). Therefore, according to the current NR specification, in a case where the value of the timing of beam switch is large, there may be a case where the TCI state (QCL assumption) of the AP-CSI-RS cannot be appropriately determined and the CSI cannot be measured. This may suppress an increase in communication throughput.

Therefore, the present inventors have conceived of a method of appropriately performing a control of the CSI-RS reception operation (for example, determination of the TCI state (QCL assumption)) even when a large value is supported as the beam switch timing.

Hereinafter, embodiments according to the present disclosure will be described in detail with reference to the drawings. A radio communication method according to each of the embodiments may be applied independently, or may be applied in combination.

Note that, in the present disclosure, a panel, an uplink (UL) transmission entity, a TRP, a demodulation reference signal (DMRS) port, a DMRS port group, a code division multiplexing (CDM) group, a PDSCH, a codeword, a base station, and the like may be replaced with each other. Further, the panel identifier (ID) and the panel may be replaced with each other. The TRP ID and the TRP may be replaced with each other. In addition, the ID and the index may be replaced with each other.

Furthermore, in the present disclosure, a case where the CSI-RS corresponds to aperiodic CSI (AP-CSI or A-CSI) is assumed, but the present disclosure is not limited thereto, and the present disclosure may be applied to CSI (for example, SP-CSI or the like) in which transmission is instructed by the DCI.

(First Aspect)

In a first aspect, the reception of the CSI-RS is controlled based on the value of given information (for example, beam switch timing) reported by the UE.

For example, the CSI-RS reception operation in a case where the value of the given information reported by the UE is equal to or more than the given value (for example, 224 or 336) may be configured separately from the case where the value is less than the given value.

The given information (for example, beam switch timing) reported by the UE may be UE capability information regarding the minimum number of symbols between the DCI and the CSI-RS. The DCI may be DCI used to trigger the CSI-RS. The relation between the DCI and the CSI-RS may be defined by a period (for example, the number of symbols) from the last symbol of the PDCCH transmitting the DCI to the first symbol corresponding to the CSI-RS resource.

A plurality of candidate values may be defined as the given information reported by the UE. For example, the UE selects a given value among the plurality of candidate values and reports the value to the base station. An example of the plurality of candidate values may be {14, 28, 48, 224, 336} symbols. Of course, the candidate value is not limited thereto, and other values may be additionally defined, or some values may not be included. Note that the UE that has reported the candidate (for example, 224 or 336) of the given value or more may control on/off of the power of the given panel (or an antenna port, an antenna port group).

The UE may control the CSI-RS reception operation according to whether or not the value of the reported given information is a given value (or a given threshold value) or more. For example, when the value of the given information is less than the given value (first value) and when the value of the given information is equal to or more than the given value (second value), the UE may control the reception of the CSI-RS using at least one of different operations, methods, and conditions.

Alternatively, the CSI-RS reception operation (for example, the applied TCI state, quasi-co-location, or the like) may be defined separately for the case where the value of the given information is less than the given value (first value) and the case where the value of the given information is equal to or more than the given value (second value).

As an example, the first value may be {14, 28, 48} symbols and the second value may be {224, 336} symbols. The values are of course not limited thereto. For example, the second value may be {48, 224, 336} symbols. Further, the CSI-RS reception operation may be controlled assuming that the UE has reported the second value when the UE does not report the beam switch timing.

An example of the AP-CSI-RS reception operation when the UE reports the second value (for example, 224 or 336) as the predetermined information will be described below.

A case where the scheduling offset of the AP-CSI-RS is greater than or equal to the beam switch timing reported by the UE is assumed. In such a case, the UE may expect to apply the QCL assumption in the indicated TCI state for the AP-CSI-RS resource in the CSI trigger state indicated by the CSI trigger (request) field of the DCI. That is, in this case, the UE may receive the AP-CSI-RS based on the TCI state indicated by the DCI.

Next, a case where the scheduling offset of the AP-CSI-RS is less than the beam switch timing reported by the UE (for example, 224 or 336 symbols) is assumed. In such a case, the UE may control the reception of the AP-CSI-RS using at least one of Reception Operations 1 to 3 described below.

<Reception Operation 1>

The UE may control the reception of the AP-CSI-RS using a given QCL assumption (or TCI state) defined or configured in advance. The given QCL defined or configured in advance may be referred to as a default QCL (or default TCI state). The default QCL may be a QCL corresponding to a given PDCCH (or DMRS for PDCCH).

For example, the UE may apply the QCL assumption corresponding to a given CORESET. The given CORESET may be a CORESET associated with a monitored search space with the lowest CORESET-ID in a given slot (for example, the latest slot) of one or more CORESETs in the active BWPs of the serving cell monitored by the UE (the UE applies the QCL assumption of the CORESET associated with a monitored search space with the lowest CORESET-ID in the latest slot in which one or more CORESETs within the active BWP of the serving cell are monitored by the UE).

Alternatively, the UE may assume that the AP-CSI-RS of the serving cell is QCL with a reference signal (RS) in the TCI state regarding QCL parameters used to indicate a PDCCH QCL of a CORESET associated with a monitored search space with the lowest CORESET-ID in the latest slot in which one or more CORESETs in the active BWPs of the serving cell are monitored by the UE (if there is no any other DL signal with an indicated TCI state in the same symbols as the CSI-RS, the UE may assume that the A-CSI-RS of a serving cell are quasi co-located with the RS(s) in the TCI state with respect to the QCL parameter(s) used for PDCCH quasi co-location indication of the CORESET associated with a monitored search space with the lowest CORESET-ID in the latest slot in which one or more CORESETs within the active BWP of the serving cell are monitored by the UE).

Note that, in the present disclosure, the CORESET-ID may be an ID (ID for identifying a CORESET) configured by an RRC information element "ControlResourceSet". Further, in the present disclosure, the "lowest CORESET-ID" may be replaced with a specific CORESET-ID (for example, the highest CORESET-ID).

Furthermore, in the present disclosure, the "latest slot" may mean the latest slot from the timing of receiving the scheduled AP-CSI-RS, or may mean the latest slot from the timing of receiving the DCI (PDCCH) for scheduling the AP-CSI-RS. Alternatively, it is not limited to the latest slot, but a given CORESET-ID in another given slot may be used.

FIG. 1 is a diagram illustrating an example of a QCL assumption of an AP CSI-RS according to Reception Operation 1. FIG. 1 illustrates an example in which DCI 1 schedules (triggers) the AP-CSI-RS.

In FIG. 1, Scheduling Offset 1 between DCI 1 and the AP CSI-RS is smaller than the beam switch timing. In this case, the UE may apply the QCL assumption of the CORESET associated with the monitored search space with the lowest CORESET-ID in the latest slot described above to receive the AP CSI-RS.

According to the first embodiment described above, even when the scheduling offset related to the AP CSI-RS is smaller than the beam switch timing, the QCL assumption of the AP CSI-RS can be determined based on the given CORESET, and the reception of the AP CSI-RS can be suitably performed using the QCL assumption.

<Reception Operation 2>

The UE may control the reception of the CSI-RS using a given QCL assumption (or TCI state) corresponding to another DL signal transmitted in the same symbol as the AP-CSI-RS. That is, even when the scheduling offset of the AP-CSI-RS is less than the beam switch timing reported by the UE, when there is another DL signal in the same symbol as the AP-CSI-RS, the QCL of the AP-CSI-RS is assumed to be the QCL corresponding to the DL signal in the same symbol.

For example, when there is another DL signal having the indicated TCI state in the same symbol as the AP-CSI-RS, the UE may apply the QCL assumption of the another DL signal when receiving the AP-CSI-RS (if there is any other DL signal with an indicated TCI state in the same symbols as the CSI-RS, the UE applies the QCL assumption of the other DL signal also when receiving the aperiodic CSI-RS).

Another DL signal may be at least one of a PDSCH having a scheduling offset equal to or larger than a given threshold value (UE capability information "timeDurationForQCL") (that is, the offset from the reception of the DCI to the start of reception of the PDSCH scheduled by the DCI is equal to or larger than the given threshold value), an AP-CSI-RS (that is, another AP-CSI-RS), a P-CSI-RS, and an SP-CSI-RS having a scheduling offset equal to or larger than the beam switch timing reported by the UE.

Figure 2:
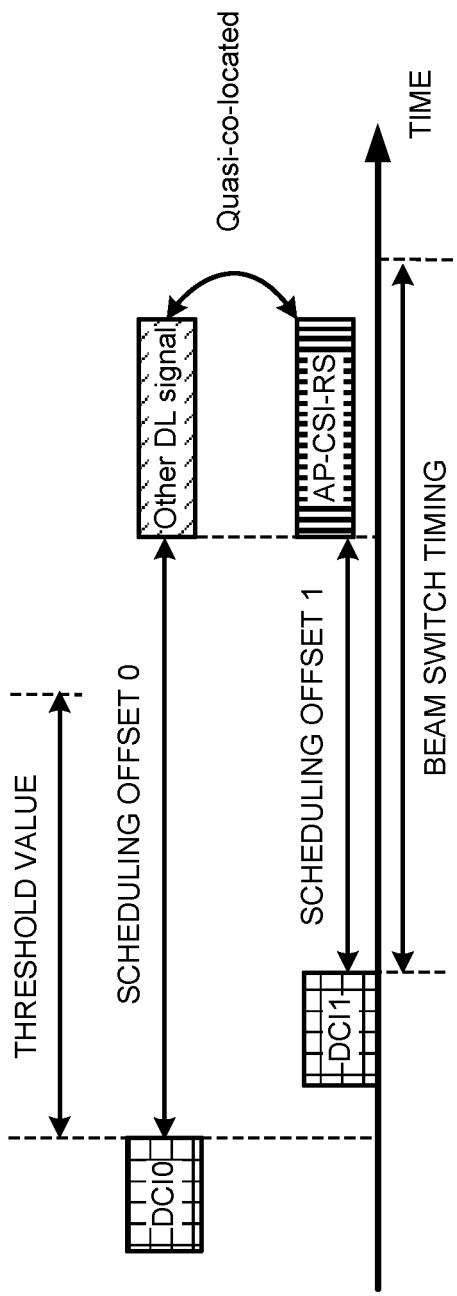
FIG. 2 is a diagram illustrating another example of QCL assumption of an AP CSI-RS according to the first aspect.

FIG. 2 is a diagram illustrating an example of the QCL assumption of an AP CSI-RS. FIG. 2 illustrates an example in which DCI 1 schedules (triggers) an AP-CSI-RS, and DCI 0 schedules another DL signal in the same symbol as the AP-CSI-RS. It is assumed that the UE includes 224 or 336 as the value of the beam switch timing in the UE capability information and reports it to the network.

In FIG. 2, Scheduling Offset 1 between DCI 1 and the AP CSI-RS is smaller than the beam switch timing. On the other hand, Scheduling Offset 0 between DCI 0 and another DL signal is equal to or larger than the threshold value. In this case, the UE may apply the QCL assumption of the another DL signal to the reception of the AP CSI-RS.

Note that the timing of reception of DCI 0 and DCI 1 in FIG. 2 is not limited thereto. The embodiments of the present disclosure are also applicable to a case where the timing of reception of DCI for scheduling an AP-CSI-RS and DCI for scheduling another DL signal are the same.

Alternatively, the UE may apply the QCL assumption of another DL signal assigned to the same symbol as the AP-CSI-RS when receiving the AP-CSI-RS regardless of whether another DL signal has or does not have the indicated TCI state (if there is any other DL signal regardless with or without an indicated TCI state in the same symbols as the CSI-RS, the UE applies the QCL assumption of the other DL signal also when receiving the aperiodic CSI-RS).

For example, when there is another DL signal in the same symbol as the AP-CSI-RS, the UE may apply the QCL assumption of the another DL signal when receiving the AP-CSI-RS (if there is any other DL signal in the same symbols as the CSI-RS, the UE applies the QCL assumption of the other DL signal also when receiving the aperiodic CSI-RS).

"Another DL signal" in this case may be replaced with at least one of the PDSCH irrelevant to whether or not the PDSCH has a scheduling offset equal to or larger than a given threshold value (for example, UE capability information "timeDurationForQCL"), the AP-CSI-RS, the P-CSI-RS, and the SP-CSI-RS irrelevant to whether or not they have a scheduling offset equal to or larger than the beam switch timing reported by the UE.

Here, the PDSCH irrelevant to whether or not it has the scheduling offset equal to or larger than the given threshold value may be replaced with the PDSCH having the scheduling offset irrelevant to whether or not it is smaller than the given threshold value. Further, the AP-CSI-RS irrelevant to whether or not it has the scheduling offset equal to or larger than the aforementioned beam switch timing reported by the UE may be replaced with the AP-CSI-RS having the scheduling offset irrelevant to whether or not it is smaller than the aforementioned beam switch timing.

In a case where the use of the DL signal without the indicated TCI state is also permitted, "another DL signal with the indicated TCI state" specified in the NR specification so far may be specified to be simply "another DL signal", and the another DL signal may be specified to refer to the PDSCH, the AP-CSI-RS, the P-CSI-RS, and the SP-CSI-RS. That is, the limitation of the scheduling offset may be eliminated from the PDSCH and the AP-CSI-RS as another DL signal.

Thus, when the scheduling offset related to the AP CSI-RS is smaller than the beam switch timing and another DL signal exists in the same symbol, the QCL assumption of the AP CSI-RS can be determined based on the another DL signal. As a result, reception of the AP CSI-RS can be suitably performed using the QCL assumption corresponding to another DL signal.

<Reception Operation 3>

The UE may control the reception of the CSI-RS using a given QCL assumption (or TCI state) defined or configured in advance only when there is no other DL signal in the same symbol as the AP-CSI-RS.

That is, even when the scheduling offset of the AP-CSI-RS is less than the beam switch timing reported by the UE, when there is another DL signal in the same symbol as the AP-CSI-RS, reception of the CSI-RS is controlled using a given QCL assumption (or TCI state) corresponding to the another DL signal (see, for example, FIG. 2).

On the other hand, in a case where there is no other DL signal in the same symbol as the AP-CSI-RS (if there is no any other DL signal in the same symbols as the CSI-RS), the reception of the CSI-RS is controlled using a given QCL assumption (or TCI state) defined or configured in advance (see, for example, FIG. 1). It is sufficient if the CSI-RS reception control using the given QCL assumption defined or configured in advance is controlled similarly to Reception Operation 1.

Note that another DL signal may be limited to a given DL signal (for example, a DL signal with an indicated TCI state). In this case, when there is only a DL signal without the indicated TCI state in the same symbol as the AP-CSI-RS, a given QCL assumption (or TCI state) defined or configured in advance may be used.

Figure 3:
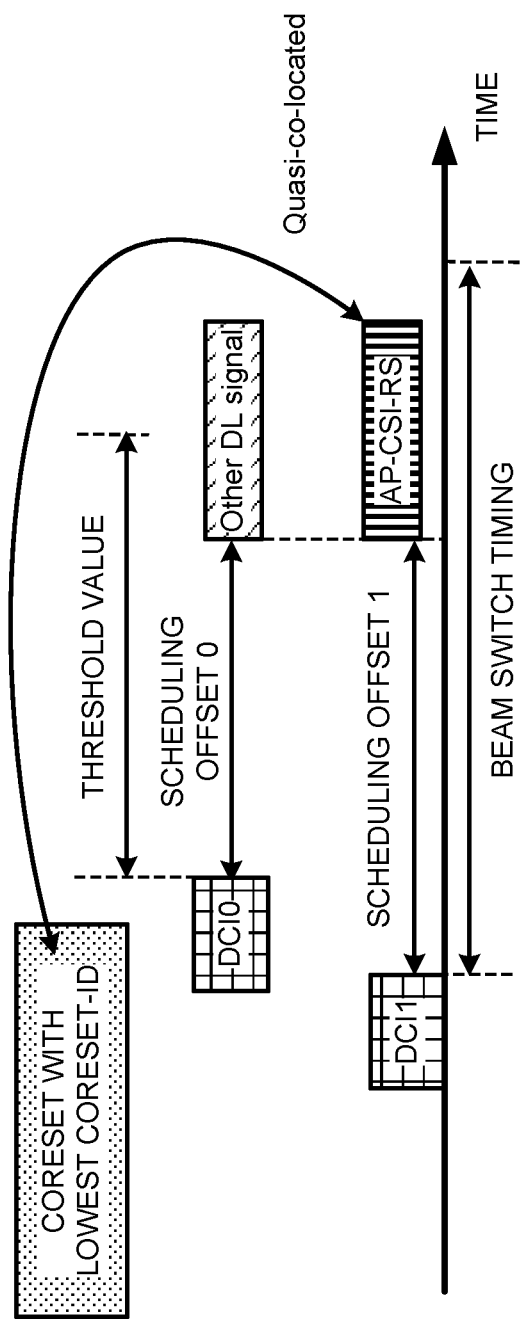
FIG. 3 is a diagram illustrating another example of QCL assumption of an AP CSI-RS according to the first aspect.

For example, when there is no PDSCH or the like having a scheduling offset equal to or larger than a predetermined threshold value (UE capability information "timeDurationForQCL") as another DL signal with the indicated TCI state in the same symbol as the AP-CSI-RS, the UE may apply the QCL assumption of a predetermined CORESET to the AP-CSI-RS (see, for example, FIG. 3).

FIG. 3 illustrates an example in which DCI 1 schedules (triggers) an AP-CSI-RS, and DCI 0 schedules another DL signal in the same symbol as the AP-CSI-RS.

In FIG. 3, Scheduling Offset 1 between DCI 1 and the AP CSI-RS is smaller than the beam switch timing. In addition, Scheduling Offset 0 between DCI 0 and another DL signal is smaller than the threshold value. In this case, the UE may apply the QCL assumption of the CORESET associated with the monitored search space with the lowest CORESET-ID in the latest slot described above to the receiving of the AP CSI-RS.

Note that at least one of the AP-CSI-RS, the P-CSI-RS, and the SP-CSI-RS may be used as another DL signal even when they do not have a scheduling offset equal to or larger than the beam switch timing reported by the UE.

In Reception Operation 3, even when the scheduling offset related to the AP CSI-RS is smaller than the beam switch timing and there is no other DL signal with the indicated ICI state, the QCL assumption of the AP CSI-RS can be determined based on the given CORESET, and the reception of the AP CSI-RS can be suitably performed using the QCL assumption.

(Second Aspect)

In a second aspect, the reception of the CSI-RS is commonly controlled regardless of the value of given information (for example, beam switch timing) reported by the UE.

For example, the reception method (for example, at least one of Reception Operations 1 to 3) described in the first aspect may be similarly applied not only to the case where 224 or 336 is reported as the beam switch timing but also to the case where at least one of 14, 28, and 48 is reported as the beam switch timing.

Thus, even when the scheduling offset related to the AP CSI-RS is smaller than the beam switch timing, the CSI-RS reception operation can be commonly controlled regardless of the value of the given information reported by the UE. As a result, the reception operation of the UE can be simplified, and an increase in processing load can be suppressed.

(Other Aspects)

In each of the above aspects, the example has been described in which the UE applies the QCL assumption of the given CORESET with the lowest CORESET-ID in the latest slot to the AP-CSI-RS. The "given CORESET with the lowest CORESET-ID in the latest slot" may be read as DCI (PDCCH) (or CORESET including the PDCCH) that triggers (schedules) the AP-CSI-RS.

Note that the beam switch timing of the AP-CSI-RS and the threshold value (beam switch timing) of another DL signal when the another DL signal is the AP-CSI-RS may have different values. For example, when the AP-CSI-RS and another DL signal are transmitted or received using different cells or different panels, the beam switch timings may be different.

In the above-described embodiments and the current NR specification, some of them indicate the configuration in which the QCL assumption of the AP CSI-RS is determined based on another DL signal in the same symbol as the AP-CSI-RS. At least one of the following (A) to (C) may be added to the condition for determining the QCL assumption of the AP CSI-RS based on the another DL signal described with respect to at least one of the above-described embodiments and current NR specification:

(A) The time resources of the AP-CSI-RS and another DL signal overlap (or match) for at least one symbol,
(B) The time resources of the AP-CSI-RS and another DL signal overlap (or match) for all symbols of the AP-CSI-RS, and
(C) The time resources of the AP-CSI-RS and another DL signal overlap (or match) for all symbols of the another DL signal.

That is, in a case where at least one of the above (A) to (C) is further satisfied, the UE may determine the QCL assumption of the AP CSI-RS based on another DL signal in the same symbol as the AP-CSI-RS, and otherwise, may assume the default QCL assumption. Here, the default QCL assumption may be a QCL assumption applied to a CORESET associated with a monitored search space with the lowest CORESET-ID in the latest slot in which one or more CORESETs in the active BWPs of the serving cell are monitored.

The above (B) is not satisfied, for example, when the time resource of the AP-CSI-RS is longer than the time resource of the another DL signal. The above (C) is not satisfied, for example, when the time resource of the AP-CSI-RS is shorter than the time resource of the another DL signal.

By considering these conditions, for example, in a case where a plurality of other DL signals is received in the same symbol as the AP-CSI-RS, a more appropriate QCL assumption with another DL signal can be applied to the AP-CSI-RS.

(Radio Communication System)

Hereinafter, a configuration of a radio communication system according to one embodiment of the present disclosure will be described. In the radio communication system, communication is performed by using one or a combination of the above-described radio communication methods according to the embodiments of the present disclosure.

Figure 4:
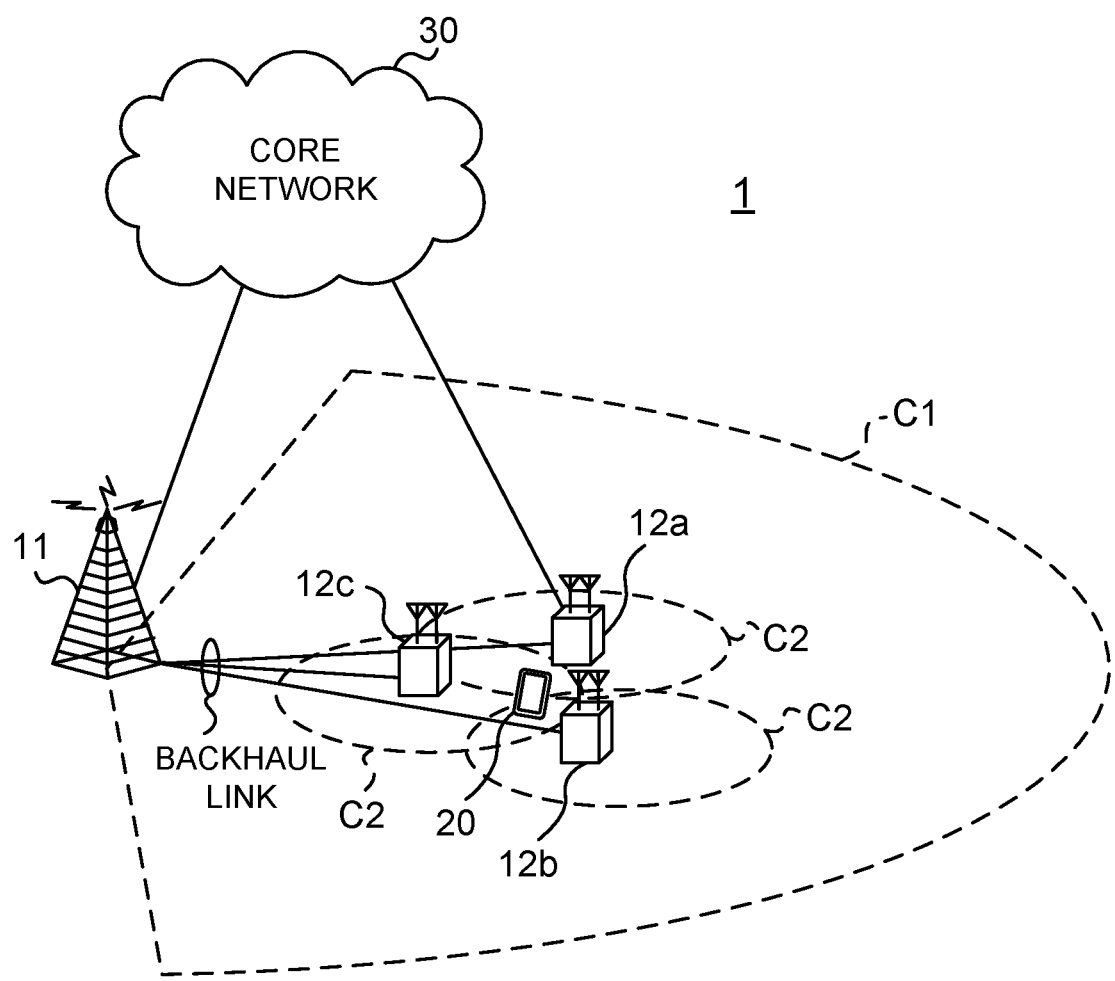
FIG. 4 is a diagram illustrating an example of a schematic configuration of a radio communication system according to one embodiment.

FIG. 4 is a diagram illustrating an example of a schematic configuration of a radio communication system according to one embodiment. A radio communication system 1 may be a system that implements communication using Long Term Evolution (LTE), 5th generation mobile communication system New Radio (5G NR), and the like specified by Third Generation Partnership Project (3GPP).

The radio communication system 1 may support dual connectivity (multi-RAT dual connectivity (MR-DC)) between a plurality of pieces of radio access technology (RAT). MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SN). In NE-DC, the NR base station (gNB) is MN, and an LTE (E-UTRA) base station (eNB) is SN.

The radio communication system 1 may support dual connectivity between a plurality of base stations in the same RAT (e.g., dual connectivity in which both MN and SN are NR base stations (gNB) (NR-NR dual connectivity (NN-DC)).

The radio communication system 1 may include a base station 11 and base stations 12 (12a to 12c). The base station 11 forms a macro cell C1 with a relatively wide coverage. The base stations 12 (12a to 12c) are disposed in the macro cell C1, and form a small cell C2 narrower than the macro cell C1. User terminal 20 may be located in at least one cell. The arrangement, number, and the like of cells and the user terminal 20 are not limited to the aspects illustrated in the drawings. The base stations 11 and 12 will be collectively referred to as base stations 10 unless these base stations are distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range (frequency range 1 (FR1)) and a second frequency range (frequency range 2 (FR2)). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of FR1 and FR2 are not limited thereto, and FR1 may correspond to a frequency range higher than FR2, for example.

The user terminal 20 may perform communication in each CC by using at least one of time division duplex (TDD) and frequency division duplex (FDD).

The plurality of base stations 10 may be connected by wire (e.g., optical fiber in compliance with common public radio interface (CPRI) or an X2 interface) or by radio (e.g., NR communication). For example, when NR communication is used as backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include at least one of, for example, an evolved packet core (EPC), a 5G core network (5GCN), and a next generation core (NGC).

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that, in the radio communication system 1, another radio access method (e.g., another single carrier transmission method and another multi-carrier transmission method) may be used as UL and DL radio access methods.

In the radio communication system 1, a downlink shared channel (physical downlink shared channel (PDSCH)) shared by each user terminal 20, a broadcast channel (physical broadcast channel (PBCH)), a downlink control channel (physical downlink control channel (PDCCH)), and the like may be used as downlink channels.

In the radio communication system 1, an uplink shared channel (physical uplink shared channel (PUSCH)) shared by each user terminal 20, an uplink control channel (physical uplink control channel (PUCCH)), a random access channel (physical random access channel (PRACH)), and the like may be used as uplink channels.

User data, higher layer control information, a system information block (SIB), and the like are transmitted by the PDSCH. User data, higher layer control information, and the like may be transmitted by the PUSCH. Master information block (MIB) may be transmitted by the PBCH.

Lower layer control information may be transmitted by the PDCCH. The lower layer control information may include, for example, downlink control information (DCI) including scheduling information of at least one of the PDSCH and the PUSCH.

Note that, the DCI that schedules the PDSCH may be referred to as DL assignment, DL DCI, and the like, and the DCI that schedules the PUSCH may be referred to as UL grant, UL DCI, and the like. Note that the PDSCH may be replaced with DL data, and the PUSCH may be replaced with UL data.

A control resource set (CORESET) and a search space may be used to detect the PDCCH. The CORESET corresponds to a resource that searches for DCI. The search space corresponds to a search area and a search method for PDCCH candidates. One CORESET may be associated with one or a plurality of search spaces. The UE may monitor the CORESET associated with a certain search space based on the search space configuration.

One search space may correspond to a PDCCH candidate corresponding to one or a plurality of aggregation levels. One or a plurality of search spaces may be referred to as a search space set. Note that "search space", "search space set", "search space configuration", "search space set configuration", "CORESET", "CORESET configuration", and the like in the present disclosure may be replaced with each other.

Uplink control information (UCI) including at least one of channel state information (CSI), delivery confirmation information (which may be referred to as, e.g., hybrid automatic repeat request acknowledgement (HARQ-ACK), ACK/NACK, and the like), and scheduling request (SR) may be transmitted by the PUCCH. A random access preamble for establishing connection with a cell may be transmitted by the PRACH.

Note that, in the present disclosure, downlink, uplink, and the like may be expressed without "link". Furthermore, various channels may be expressed without "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as DL-RS.

The synchronization signal may be at least one of, for example, a primary synchronization signal (PSS) and a secondary synchronization signal (SSS). A signal block including SS (PSS and SSS) and PBCH (and DMRS for PBCH) may be referred to as an SS/PBCH block, an SS block (SSB), and the like. Note that SS, SSB, and the like may also be referred to as a reference signal.

Furthermore, in the radio communication system 1, a sounding reference signal (SRS), a demodulation reference signal (DMRS), and the like may be transmitted as an uplink reference signal (UL-RS). Note that, DMRSs may be referred to as "user terminal-specific reference signals (UE-specific Reference Signals)."

(Base Station)

Figure 5:
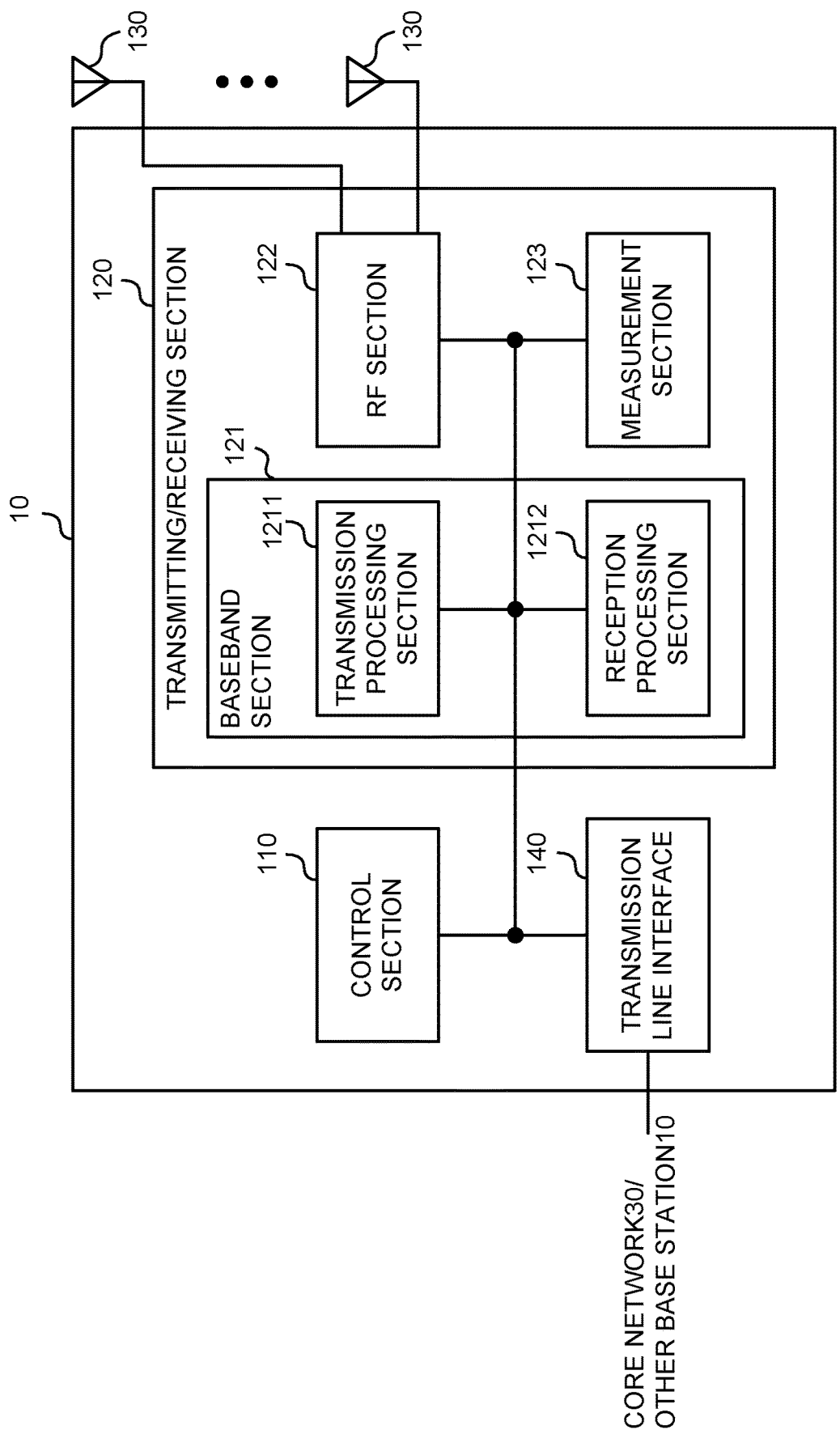
FIG. 5 is a diagram illustrating an example of a configuration of a base station according to one embodiment.

FIG. 5 is a diagram illustrating an example of a configuration of a base station according to one embodiment. The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be included.

Note that the example mainly describes functional blocks of characteristic parts in the embodiment, and it may be assumed that the base station 10 also includes other functional blocks necessary for radio communication. A part of processing of each section described below may be omitted.

The control section 110 controls the entire base station 10. The control section 110 can include a controller, a control circuit, and the like that are described based on common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or release) of a communication channel, management of the state of the base station 10, management of a radio resource, and the like.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described based on common recognition in the technical field related to the present disclosure.

The transmitting/receiving section 120 may be constituted as an integrated transmitting/receiving section, or may be constituted by a transmitting section and a receiving section. The transmitting section may be constituted by the transmission processing section 1211 and the RF section 122. The receiving section may be constituted by the reception processing section 1212, the RF section 122, and the measurement section 123.

The transmission/reception antenna 130 can include an antenna described based on common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data or control information acquired from the control section 110 to generate a bit string to be transmitted.

The transmitting/receiving section 120 (transmission processing section 1211) may perform transmission processing such as channel encoding (which may include error correction coding), modulation, mapping, filtering processing, discrete Fourier transform (DFT) processing (if necessary), inverse fast Fourier transform (IFFT) processing, precoding, or digital-analog transform on the bit string to be transmitted, and may output a baseband signal.

The transmitting/receiving section 120 (RF section 122) may perform modulation to a radio frequency range, filtering processing, amplification, and the like on the baseband signal, and may transmit a signal in the radio frequency range via the transmission/reception antenna 130.

Meanwhile, the transmitting/receiving section 120 (RF section 122) may perform amplification, filtering processing, demodulation to a baseband signal, and the like on the signal in the radio frequency range received by the transmission/reception antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), reception quality (for example, reference signal reception quality (RSRQ), signal to interference plus noise ratio (SINR), or signal to noise ratio (SNR)), signal strength (for example, received signal strength indicator (RSSI)), propagation path information (for example, CSI), and the like. The measurement result may be output to the control section 110.

The transmission line interface 140 may perform transmission/reception of a signal (backhaul signaling) to/from an apparatus, another base station 10, or the like included in the core network 30, and may perform acquisition, transmission, or the like of user data (user plane data), control plane data, and the like for the user terminal 20.

Note that the transmitting section and the receiving section of the base station 10 in the present disclosure may be constituted by at least one of the transmitting/receiving section 120, the transmission/reception antenna 130, and the transmission line interface 140.

Note that the transmitting/receiving section 120 transmits downlink control information that triggers a channel state information reference signal. Further, the transmitting/receiving section 120 receives given information (for example, beam switch timing) related to the minimum number of symbols between the downlink control information and the channel state information reference signal.

The control section 110 may control the transmission operation of the channel state information reference signal according to whether or not the value of the given information is equal to or greater than a given value.

(User Terminal)

Figure 6:
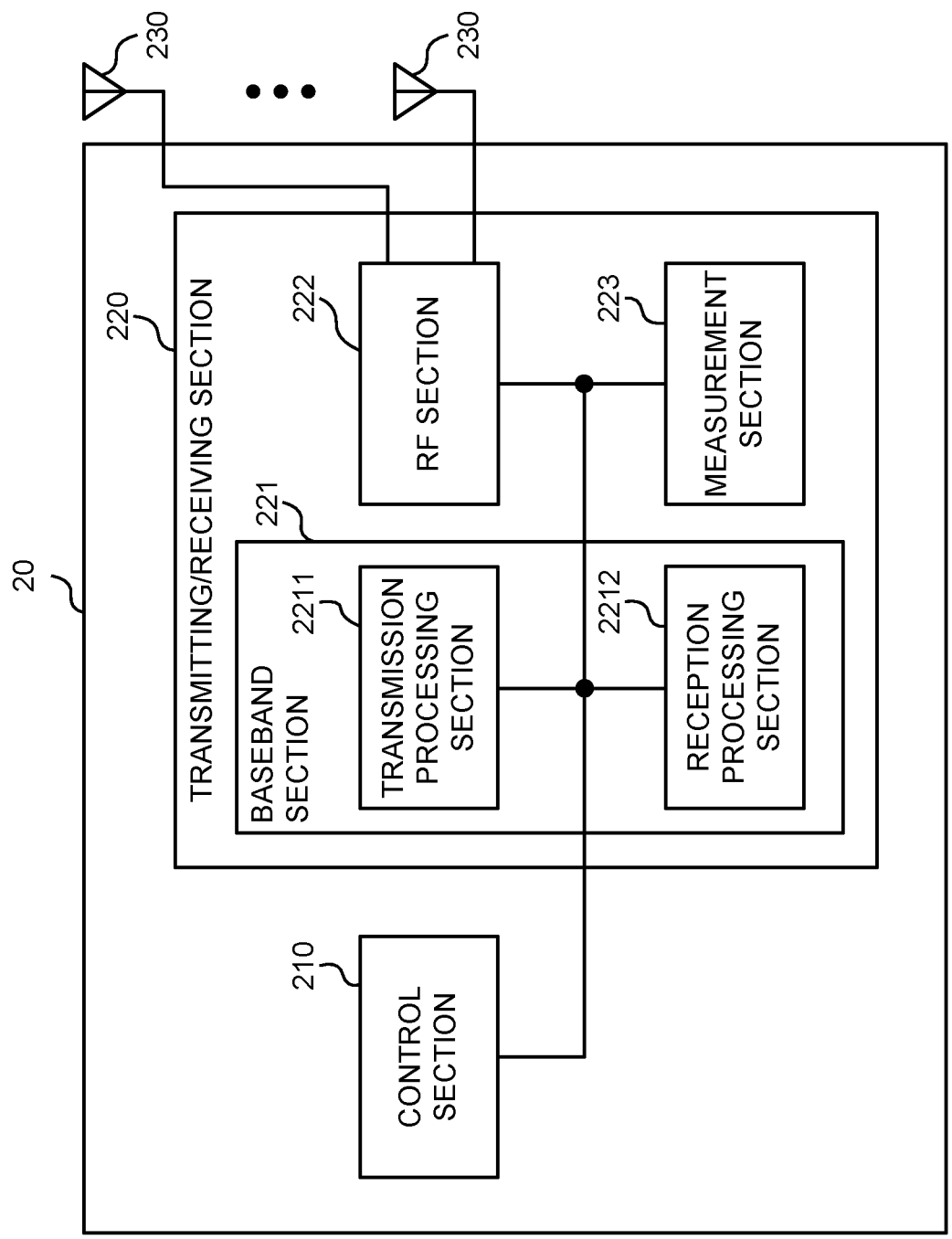
FIG. 6 is a diagram illustrating an example of a configuration of user terminal according to one embodiment.

FIG. 6 is a diagram illustrating an example of a configuration of user terminal according to one embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that, although this example mainly describes a functional block which is a characteristic part of the present embodiment, it may be assumed that the user terminal 20 also has another functional block necessary for radio communication. A part of processing of each section described below may be omitted.

The control section 210 controls the entire user terminal 20. The control section 210 can be constituted by a controller, a control circuit, or the like, which is described based on common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted by a transmitter/receiver, an RF circuit, a baseband circuit, a filter, a phase shifter, a measurement circuit, a transmission/reception circuit, and the like, which are described based on common recognition in the technical field related to the present disclosure.

The transmitting/receiving section 220 may be constituted as an integrated transmitting/receiving section, or may be constituted by a transmitting section and a receiving section. The transmitting section may be constituted by the transmission processing section 2211 and the RF section 222. The receiving section may be constituted by the reception processing section 2212, the RF section 222, and the measurement section 223.

The transmission/reception antenna 230 can be constituted by an antenna described based on common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data or control information acquired from the control section 210 to generate a bit string to be transmitted.

The transmitting/receiving section 220 (transmission processing section 2211) may perform transmission processing such as channel encoding (which may include error correction coding), modulation, mapping, filtering processing, DFT processing (if necessary), IFFT processing, precoding, or digital-analog transform on a bit string to be transmitted, and may output a baseband signal.

Note that whether or not to apply DFT processing may be determined based on configuration of transform precoding. When transform precoding is enabled for a channel (for example, PUSCH), the transmitting/receiving section 220 (transmission processing section 2211) may perform DFT processing as the transmission processing in order to transmit the channel using a DFT-s-OFDM waveform. When transform precoding is not enabled for a channel (for example, PUSCH), the transmitting/receiving section 220 (transmission processing section 2211) does not have to perform DFT processing as the transmission processing.

The transmitting/receiving section 220 (RF section 222) may perform modulation to a radio frequency range, filtering processing, amplification, and the like on the baseband signal, and may transmit a signal in the radio frequency range via the transmission/reception antenna 230.

Meanwhile, the transmitting/receiving section 220 (RF section 222) may perform amplification, filtering processing, demodulation to a baseband signal, and the like on the signal in the radio frequency range received by the transmission/reception antenna 230.

The transmitting/receiving section 220 (reception processing section 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired baseband signal.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), reception quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may be constituted by at least one of the transmission/receiving section 220 and the transmission/reception antenna 230.

Note that the transmitting/receiving section 220 receives the channel state information reference signal based on the downlink control information. Further, the transmitting/receiving section 220 transmits given information (for example, beam switch timing) related to the minimum number of symbols between the downlink control information and the channel state information reference signal.

The control section 210 may control the reception operation of the channel state information reference signal according to the value of the given information (for example, whether or not the value is equal to or greater than a given value).

For example, when the value of the given information is equal to or more than a given value, the control section 210 may control the reception of the channel state information reference signal using at least one of the given transmission configuration indicator state and quasi-co-location even when the number of symbols between the downlink control information and the channel state information reference signal is less than the given value.

Further, when the value of the given information is equal to or more than the given value and the number of symbols between the downlink control information and the channel state information reference signal is less than the given value, the control section 210 may control the reception of the channel state information reference signal using at least one of the quasi-co-location and the transmission configuration indicator state corresponding to the downlink control channel defined in advance.

Alternatively, when the value of the given information is equal to or more than the given value and the number of symbols between the downlink control information and the channel state information reference signal is less than the given value, the control section 210 may control the reception of the channel state information reference signal using at least one of the quasi-co-location and the transmission configuration indicator state corresponding to a DL signal transmitted in the same symbol as the channel state information reference signal.

Alternatively, when the value of the given information is equal to or more than the given value and the number of symbols between the downlink control information and the channel state information reference signal is less than the given value, the control section 210 may control the reception of the channel state information reference signal using at least one of the quasi-co-location and the transmission configuration indicator state corresponding to a downlink control channel defined in advance when a DL signal transmitted in the same symbol as the channel state information reference signal does not exist.

(Hardware Configuration)

Note that the block diagrams that have been used to describe the above embodiments illustrate blocks in functional units. These functional blocks (configuration sections) may be implemented in arbitrary combinations of at least one of hardware and software. Further, the method for implementing each functional block is not particularly limited. That is, each functional block may be implemented by a single apparatus physically or logically aggregated, or may be implemented by directly or indirectly connecting two or more physically or logically separate apparatuses (using wires, radio, or the like, for example) and using these plural apparatuses. The functional blocks may be achieved by combining the one apparatus or the plurality of apparatuses with software.

Here, the functions include, but are not limited to, assessment, determination, judging, calculation, computation, processing, derivation, investigation, search, confirmation, reception, transmission, output, access, solution, selection, choosing, establishment, comparison, assumption, expectation, deeming, broadcasting, notifying, communicating, forwarding, configuring, reconfiguring, allocating, mapping, and assigning. For example, a functional block (configuration section) that causes transmission to function may be called as a transmitting unit, a transmitter and the like. In any case, as described above, the implementation method is not particularly limited.

Figure 7:
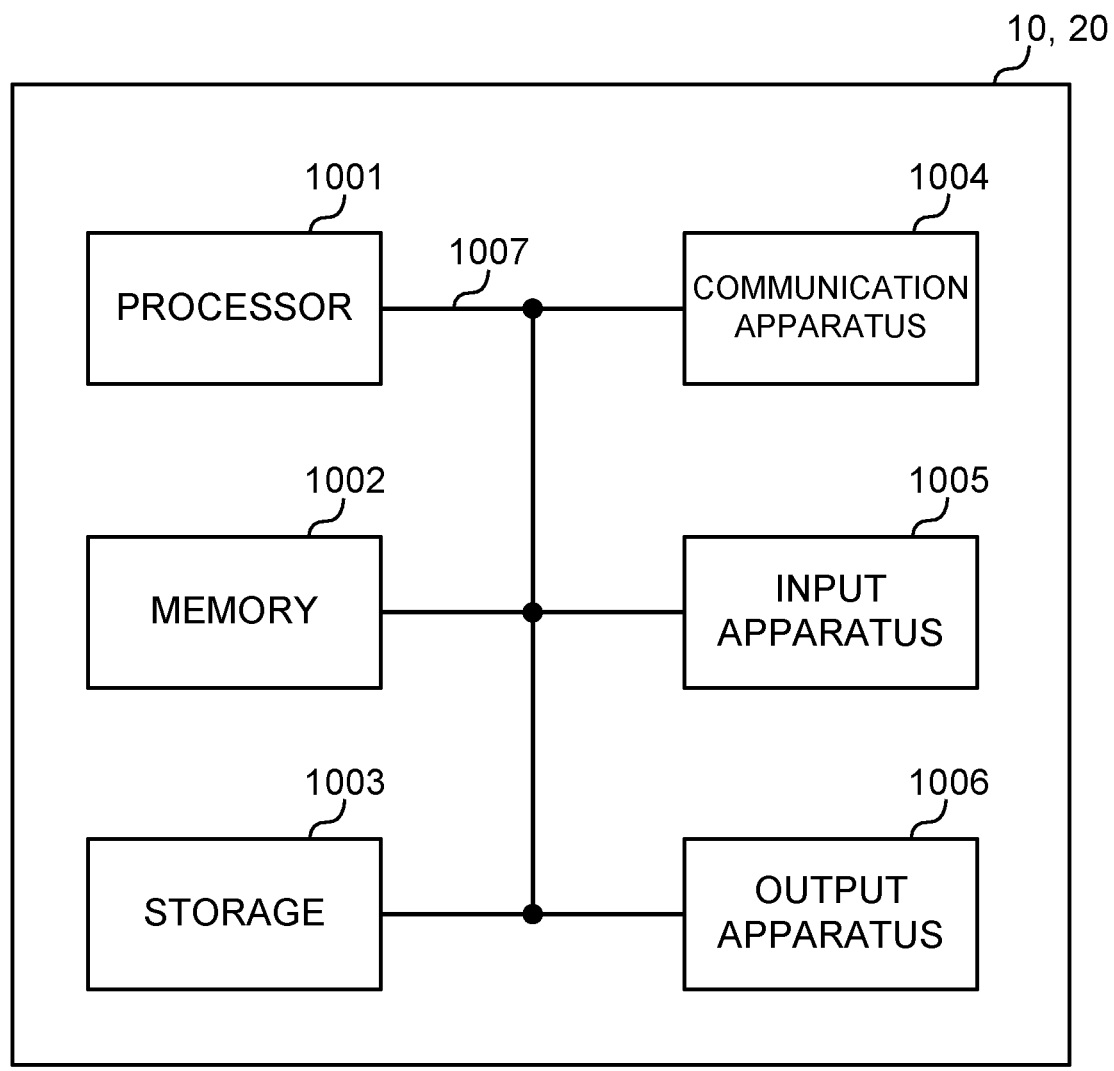
FIG. 7 is a diagram illustrating an example of a hardware configuration of the base station and the user terminal according to one embodiment.

For example, a base station, user terminal, and the like according to one embodiment of the present disclosure may function as a computer that executes the processing of the radio communication method of the present disclosure. FIG. 7 is a diagram illustrating an example of a hardware configuration of the base station and the user terminal according to one embodiment. The above-described base station 10 and user terminal 20 may be physically configured as a computer apparatus including a processor 1001, a memory 1002, a storage 1003, a communication apparatus 1004, an input apparatus 1005, an output apparatus 1006, a bus 1007, and the like.

Note that, in the present disclosure, the word such as an apparatus, a circuit, a device, a section, and a unit can be replaced with each other. The hardware configuration of the base station 10 and the user terminal 20 may be designed to include one or a plurality of each apparatuses illustrated in the drawings, or may be designed not to include some apparatuses.

For example, although only one processor 1001 is illustrated, a plurality of processors may be provided. Further, the processing may be executed by one processor, or the processing may be executed simultaneously, in sequence, or in different manners, by two or more processors. Note that the processor 1001 may be implemented with one or more chips.

Each function of the base station 10 and the user terminal 20 is implemented by reading given software (program) on hardware such as the processor 1001 and the memory 1002, and by controlling the operation in the processor 1001, the communication in the communication apparatus 1004, and at least one of the reading and writing of data in the memory 1002 and the storage 1003.

The processor 1001 may control the whole computer by, for example, running an operating system. The processor 1001 may include a central processing unit (CPU) including an interface with peripheral equipment, a control apparatus, an arithmetic apparatus, a register, and the like. For example, at least a part of the above-described control section 110 (210), transmitting/receiving section 120 (220), and the like may be implemented by the processor 1001.

Furthermore, the processor 1001 reads, for example, programs (program codes), software modules, or data from at least one of the storage 1003 and the communication apparatus 1004 into the memory 1002, and executes various kinds of processing according to these. As the program, a program to cause a computer to execute at least a part of the operation described in the above-described embodiment is used. For example, the control section 110 (210) may be implemented by a control program that is stored in the memory 1002 and operates in the processor 1001, and another functional block may be implemented similarly.

The memory 1002 is a computer-readable recording medium, and may include at least one of, for example, a read only memory (ROM), an erasable programmable rom (EPROM), an electrically EPROM (EEPROM), a random access memory (RAM), and other appropriate storage media. The memory 1002 may be referred to as a register, a cache, a main memory (main storage apparatus), and the like. The memory 1002 can store a program (program code), a software module, and the like, which are executable for implementing the radio communication method according to one embodiment of the present disclosure.

The storage 1003 is a computer-readable recording medium, and may include at least one of, for example, a flexible disk, a floppy (registered trademark) disk, a magneto-optical disk (e.g., compact disc (compact disc ROM (CD-ROM) and the like), digital versatile disc, Blu-ray (registered trademark) disk), a removable disk, a hard disk drive, a smart card, a flash memory device (e.g., card, stick, and key drive), a magnetic stripe, a database, a server, and other appropriate storage media. The storage 1003 may be referred to as an auxiliary storage apparatus.

The communication apparatus 1004 is hardware (transmitting/receiving device) for performing inter-computer communication via at least one of a wired network or a radio network, and is referred to as, for example, a network device, a network controller, a network card, and a communication module. The communication apparatus 1004 may include a high frequency switch, a duplexer, a filter, a frequency synthesizer, and the like in order to implement at least one of, for example, frequency division duplex (FDD) and time division duplex (TDD). For example, the transmitting/receiving section 120 (220), the transmission/reception antenna 130 (230), and the like described above may be implemented by the communication apparatus 1004. The transmitting/receiving section 120 (220) may be implemented by physically or logically separating a transmitting section 120a(220a) and a receiving section 120b(220b) from each other.

The input apparatus 1005 is an input device that receives an input from outside (for example, a keyboard, a mouse, a microphone, a switch, a button, a sensor, and the like). The output apparatus 1006 is an output device for performing outputting to the outside (for example, a display, a speaker, a light emitting diode (LED) lamp, and the like). Note that the input apparatus 1005 and the output apparatus 1006 may be an integrated configuration (e.g., touch panel).

Furthermore, those pieces of apparatuses including the processor 1001, the memory 1002, and the like are connected by the bus 1007 for communicating information. The bus 1007 may be formed with a single bus, or may be formed with buses that vary between apparatuses.

The base station 10 and the user terminal 20 may include hardware such as a microprocessor, a digital signal processor (DSP), an application specific integrated circuit (ASIC), a programmable logic device (PLD), and a field programmable gate array (FPGA), and a part or all of each functional block may be implemented by the hardware. For example, the processor 1001 may be implemented with at least one of these pieces of hardware.

(Variations)

Note that terms described in the present disclosure and terms necessary for understanding the present disclosure may be replaced with other terms that have the same or similar meanings. For example, a channel, a symbol, and a signal (or signaling) may be replaced with each other. Further, the signal may be a message. The reference signal can be abbreviated as an RS, and may be referred to as a pilot, a pilot signal and the like, depending on which standard applies. Further, a component carrier (CC) may be referred to as a cell, a frequency carrier, a carrier frequency, and the like.

A radio frame may include one or more periods (frames) in the time domain. Each of one or a plurality of periods (frames) constituting a radio frame may be referred to as a subframe. Furthermore, a subframe may be constituted by one or a plurality of slots in the time domain. A subframe may be a fixed time duration (e.g., 1 ms) that is not dependent on numerology.

Here, the numerology may be a communication parameter applied to at least one of transmission and reception of a signal or a channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, specific windowing processing performed by a transceiver in the time domain, and the like.

The slot may include one or a plurality of symbols (e.g., orthogonal frequency division multiplexing (OFDM) symbol and single carrier frequency division multiple access (SC-FDMA) symbol) in the time domain. Further, the slot may be a time unit based on numerology.

A slot may include a plurality of mini slots. Each mini slot may be constituted by one or a plurality of symbols in the time domain. Further, a mini slot may be referred to as a subslot. Each mini slot may be constituted by fewer symbols than a slot. A PDSCH (or PUSCH) transmitted in a time unit larger than a mini slot may be referred to as PDSCH (PUSCH) mapping type A. A PDSCH (or PUSCH) transmitted using a mini slot may be called PDSCH (PUSCH) mapping type B.

A radio frame, a subframe, a slot, a mini slot, and a symbol all represent the time unit in signal communication. The radio frame, the subframe, the slot, the mini slot, and the symbol may be each called by other applicable names. Note that time units such as a frame, a subframe, a slot, a mini slot, and a symbol in the present disclosure may be replaced with each other.

For example, one subframe may be referred to as TTI. A plurality of consecutive subframes may be referred to as TTI. One slot or one mini slot may be referred to as TTI. That is, at least one of the subframe and TTI may be a subframe (1 ms) in the existing LTE, may be a period shorter than 1 ms (for example, one to thirteen symbols), or may be a period longer than 1 ms. Note that the unit to represent the TTI may be called a "slot," a "mini slot", or the like, instead of a "subframe".

Here, a TTI refers to the minimum time unit of scheduling in radio communication, for example. For example, in LTE systems, the base station schedules the radio resources (such as the frequency bandwidth and transmission power that can be used in each user terminal) to allocate to each user terminal in TTI units. Note that the definition of the TTI is not limited thereto.

The TTI may be the transmission time unit of channel-encoded data packets (transport blocks), code blocks, codewords, and the like, or may be the unit of processing in scheduling, link adaptation, and the like. Note that, when TTI is given, a time interval (e.g., the number of symbols) in which the transport blocks, the code blocks, the codewords, and the like are actually mapped may be shorter than the TTI.

Note that, when one slot or one mini slot is called a "TTI," one or more TTIs (i.e., one or multiple slots or one or more mini slots) may be the minimum time unit of scheduling. Also, the number of slots (the number of mini slots) to constitute the minimum time unit of scheduling may be controlled.

A TTI having a time length of 1 ms may be referred to as a usual TTI (TTI in 3GPP Rel. 8 to 12), a normal TTI, a long TTI, a usual subframe, a normal subframe, a long subframe, a slot, and the like. A TTI that is shorter than the usual TTI may be referred to as a shortened TTI, a short TTI, a partial TTI (or fractional TTI), a shortened subframe, a short subframe, a mini slot, a subslot, a slot, and the like.

Note that a long TTI (e.g., a normal TTI, a subframe, etc.) may be replaced with a TTI having a time duration exceeding 1 ms, and a short TTI (e.g., a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. The number of subcarriers in RB may be the same regardless of numerology, and may be 12, for example. The number of subcarriers included in the RB may be determined based on numerology.

Also, an RB may include one or more symbols in the time domain, and may be one slot, one mini slot, one subframe, or one TTI in length. One TTI, one subframe, and the like each may be comprised of one or more resource blocks.

Note that one or a plurality of RBs may be referred to as a physical resource block (Physical RB (PRB)), a sub-carrier group (SCG), a resource element group (REG), a PRB pair, an RB pair, and the like.

Further, the resource block may be constituted by one or a plurality of resource elements (REs). For example, one RE may be a radio resource domain of one subcarrier and one symbol.

The bandwidth part (BWP) (which may be called partial bandwidth and the like) may represent a subset of consecutive common resource blocks (RB) for certain numerology in a certain carrier. Here, the common RB may be specified by an RB index with reference to a common reference point of the carrier. The PRB may be defined in a BWP and numbered within that BWP.

The BWP may include BWP for UL (UL BWP) and BWP for DL (DL BWP). For the UE, one or a plurality of BWPs may be configured within one carrier.

At least one of the configured BWPs may be active, and the UE may not assume to transmit or receive a given signal/channel outside the active BWP. Note that a "cell", "carrier", and the like in the present disclosure may be read as a "BWP".

Note that the structures of radio frames, subframes, slots, mini slots, symbols and so on described above are merely examples. For example, configurations of the number of subframes in a radio frame, the number of slots per subframe or radio frame, the number of mini slots in a slot, the number of symbols and RBs in a slot or a mini slot, the number of subcarriers in RB, the number of symbols in TTI, a symbol length, a cyclic prefix (CP) length, and the like can be variously changed.

Also, the information, parameters, and the like described in the present disclosure may be represented in absolute values or in relative values with respect to given values, or may be represented using other applicable information. For example, a radio resource may be specified by a given index.

The names used for parameters and the like in the present disclosure are in no respect limiting. Further, a mathematical expression and the like using these parameters may differ from those explicitly disclosed in the present disclosure. Various channels (e.g., PUCCH and PDCCH) and information elements can be identified by any suitable name. Various names allocated to these various channels and information elements are in no respect limiting.

The information, signals, and the like described in the present disclosure may be represented using a variety of different techniques. For example, data, instructions, commands, information, signals, bits, symbols, and chips, all of which may be referenced throughout the above description, may be represented by voltages, currents, electromagnetic waves, magnetic fields or particles, optical fields or photons, or any combination of these.

Also, information, signals, and the like can be output in at least one of directions that are from upper layers to lower layers and from lower layers to upper layers. Information, signals, and the like may be input and output via a plurality of network nodes.

The input and/or output information, signals, and the like may be stored in a specific location (e.g., in a memory), or may be managed using a management table. The information, signals, and the like to be input and output can be overwritten, updated or appended. The information, signals and the like that are output may be deleted. The input information, signals, and the like may be transmitted to another apparatus.

Notification of information may be performed not only by using the aspects/embodiments described in the present disclosure but also using another method. For example, notification of information in the present disclosure may be performed by using physical layer signaling (for example, downlink control information (DCI), uplink control information (UCI)), higher layer signaling (for example, radio resource control (RRC) signaling, broadcast information (master information block (MIB), system information block (SIB), or the like), medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message and the like. Further, notification of MAC signaling may be performed using, for example, a MAC control element (MAC CE).

Also, notification of given information (e.g., notification of information to the effect that "X holds") does not necessarily have to be sent explicitly, and may be sent implicitly (e.g., by not reporting the given information, or by reporting another piece of information).

Determination may be made in values represented by one bit (0 or 1), may be made in Boolean values represented by true or false, or may be made by comparing numerical values (e.g., comparison against a given value).

Software, whether referred to as software, firmware, middleware, microcode, or hardware description language, or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and the like.

Further, software, instruction, information, and the like may be transmitted/received via a transmission medium. For example, when software is transmitted from a website, a server, or other remote sources by using at least one of wired technology (coaxial cable, optical fiber cable, twisted-pair cable, digital subscriber line (DSL), and the like) or wireless technology (infrared light, microwave, and the like), at least one of these wired technology and wireless technology is included in the definition of the transmission medium.

The terms "system" and "network" used in the present disclosure can be used interchangeably. The "network" may mean an apparatus (e.g., base station) included in the network.

In the present disclosure, terms such as "precoding", "precoder", "weight (precoding weight)", "quasi-Co-Location (QCL)", "transmission configuration indicator state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be interchangeably used.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", "component carrier", and the like may be interchangeably used. The base station may be referred to by a term such as a macro cell, a small cell, a femto cell, a pico cell, and the like.

The base station can accommodate one or a plurality of (for example, three) cells. When a base station accommodates a plurality of cells, the entire coverage area of the base station can be partitioned into a plurality of smaller areas. Each smaller area can provide communication service through a base station subsystem (e.g., indoor small base station (remote radio head (RRH))). The term "cell" or "sector" refers to a part or the whole of a coverage area of at least one of a base station and a base station subsystem that perform a communication service in this coverage.

In the present disclosure, the terms such as mobile station (MS)", "user terminal", "user terminal (UE)", and "terminal" can be used interchangeably.

A mobile station may be called a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station or the mobile station may be referred to as a transmitting apparatus, a receiving apparatus, a radio communication apparatus, and the like. Note that at least one of the base station and the mobile station may be a device mounted on a moving object, a moving object itself and the like. The moving object may be a vehicle (for example, a car, an airplane and the like), an unmanned moving object (for example, a drone, an autonomous car, and the like), or a (manned or unmanned) robot. Note that at least one of the base station and the mobile station includes an apparatus that does not necessarily move during a communication operation. For example, at least one of the base station and the mobile station may be Internet of Things (IoT) device such as a sensor.

Further, the base station in the present disclosure may be replaced with user terminal. For example, each aspect/embodiment of the present disclosure may be applied to a configuration in which communication between the base station and the user terminal is replaced with communication between a plurality of pieces of user terminal (which may be referred to as, for example, device-to-device (D2D) and vehicle-to-everything (V2X)). In this case, the user terminal 20 may be configured to have the functions of the base station 10 described above. Further, the wording such as "uplink" and "downlink" may be replaced with the wording corresponding to the terminal-to-terminal communication (for example, "side"). For example, an uplink channel, a downlink channel, and the like may be interpreted as a side channel.

Likewise, a user terminal in the present disclosure may be interpreted as a base station. In this case, the base station 10 may have the functions of the user terminal 20 described above.

In the present disclosure, the operation performed by the base station may be performed by an upper node thereof in some cases. In a network including one or a plurality of network nodes with a base station, it is clear that various operations performed so as to communicate with a terminal can be performed by a base station, one or more of network nodes (e.g., mobility management entity (MME) and serving-gateway (S-GW) may be possible, but are not limiting) other than the base station, or a combination thereof.

The aspects/embodiments described in the present disclosure may be used individually or in combinations, which may be switched depending on the mode of implementation. Further, the order of processing procedures, sequences, flowcharts, and the like of the aspects/embodiments described in the present disclosure may be re-ordered as long as inconsistencies do not arise. For example, although various methods have been shown in the present disclosure with various components of steps using exemplary orders, the specific orders that are shown herein are by no means limiting.

Each aspect/embodiment described in the present disclosure may be applied to a system using long term evolution (LTE), LTE-Advanced (LTE-A), LTE-Beyond (LTE-B), SUPER 3G, IMT-Advanced, 4th generation mobile communication system (4G), 5th generation mobile communication system (5G), future radio access (FRA), new-radio access technology (New-RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), and other appropriate radio communication methods, a next generation system expanded based thereon, and the like. Furthermore, a plurality of systems may be combined to be applied (for example, a combination of LTE or LTE-A and 5G).

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of.")

Reference to elements with designations such as "first," "second", and the like as used in the present disclosure does not generally limit the number/quantity or order of these elements. These designations may be used in the present disclosure as a method convenient in distinguishing between two or more elements. In this way, reference to the first and second elements does not imply that only two elements may be employed, or that the first element must precede the second element in some way.

The term "determining" as used in the present disclosure may encompass a wide variety of operations. For example, "determining" may be regarded as judging, calculating, computing, processing, deriving, investigating, looking up, search, inquiry (e.g., looking up in a table, database, or another data structure), ascertaining, and the like.

Furthermore, "determining" as used herein may be interpreted to mean making determination related to receiving (e.g., receiving information), transmitting (e.g., transmitting information), inputting, outputting, accessing (e.g., accessing data in a memory), and the like.

In addition, "determining" as used herein may be interpreted to mean making determination related to resolving, selecting, choosing, establishing, comparing, and the like. In other words, "determining" as used herein may be interpreted to mean making determination related to some operations.

In addition, "determining" as used herein may be interpreted to mean "assuming", "expecting", "considering", and the like.

As used in the present disclosure, the terms "connected" and "coupled," or any variation of these terms mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access."

As used in the present disclosure, when two elements are connected, these elements may be considered "connected" or "coupled" to each other by using one or more electrical wires, cables, printed electrical connections, and the like, and, as some non-limiting and non-inclusive examples, by using electromagnetic energy, such as electromagnetic energy having wavelengths in the radio frequency, microwave, and optical (both visible and invisible) domains.

In the present disclosure, the phrase "A and B are different" may mean "A and B are different from each other." Note that the phrase may mean that "A and B are different from C". The terms such as "separated", "coupled", and the like may be similarly interpreted as "different".

When terms such as "include," "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, where translations add articles, such as a, an, and the in English, the present disclosure may include that the noun that follows these articles is in the plural.

Although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Therefore, the description in the present disclosure is provided for the purpose of describing examples, and thus, should by no means be construed to limit the invention according to the present disclosure in any way.

The invention claimed is:

1. A terminal comprising:
a receiver that receives downlink control information (DCI) triggering a channel state information reference signal (CSI-RS);
a transmitter that transmits at least one of first information indicating any one of a plurality of first candidate values and second information indicating any one of a plurality of second candidate values that are different from the plurality of first candidate values and larger than any one of the plurality of first candidate values, as capability information regarding a minimum number of symbols between the DCI and the CSI-RS; and
a processor that controls a receiving operation of the CSI-RS,
wherein the processor, if the transmitter transmits the second information as capability information, a number of symbols between the DCI and the CSI-RS is smaller than a value of the second information, and there is no DL signal transmitted in a same symbol as the CSI-RS, controls the receiving operation of the CSI-RS by using a default transmission configuration indication (TCI) state or a quasi-co-location (QCL) assumption corresponding to a control resource set (CORESET) associated with a monitored search space with a lowest CORESET-ID in a latest slot.

2. The terminal according to claim 1, wherein the processor, if the transmitter transmits the second information as capability information, the number of symbols between the DCI and the CSI-RS is smaller than the value of the second information, and there is a DL signal transmitted in a same symbol as the CSI-RS, controls the receiving operation of the CSI-RS by using a QCL assumption of the DL signal.

3. A radio communication method for a terminal, comprising:
receiving downlink control information (DCI) triggering a channel state information reference signal (CSI-RS);
transmitting at least one of first information indicating any one of a plurality of first candidate values and second information indicating any one of a plurality of second candidate values that are different from the plurality of first candidate values and larger than any one of the plurality of first candidate values, as capability information regarding a minimum number of symbols between the DCI and the CSI-RS;

controlling a receiving operation of the CSI-RS in accordance with a transmission of the first information or the second information; and controlling, if the terminal transmits the second information as capability information, a number of symbols between the DCI and the CSI-RS is smaller than a value of the second information, and there is no DL signal transmitted in a same symbol as the CSI-RS, the receiving operation of the CSI-RS by using a default transmission configuration indication (TCI) state or quasi-co-location (QCL) assumption corresponding to a control resource set (CORESET) associated with a monitored search space with a lowest CORESET-ID in a latest slot.

4. A system comprising a terminal and a base station, wherein the terminal comprises:
  a receiver that receives downlink control information (DCI) triggering a channel state information reference signal (CSI-RS);
  a transmitter that transmits at least one of first information indicating any one of a plurality of first candidate values and second information indicating any one of a plurality of second candidate values that are different from the plurality of first candidate values and larger than any one of the plurality of first candidate values, as capability information regarding a minimum number of symbols between the DCI and the CSI-RS; and
  a processor that controls a receiving operation of the CSI-RS in accordance with a transmission of the first information or the second information,
  wherein the processor, if the transmitter transmits the second information as capability information, a number of symbols between the DCI and the CSI-RS is smaller than a value of the second information, and there is no DL signal transmitted in a same symbol as the CSI-RS, controls the receiving operation of the CSI-RS by using a default transmission configuration indication (TCI) state or a quasi-co-location (QCL) assumption corresponding to a control resource set (CORESET) associated with a monitored search space with a lowest CORESET-ID in a latest slot, and the base station comprises:
  a transmitter that transmits the DCI, and
  a receiver that receives the first information and the second information.

* * * * *